May 14, 1935.  H. F. DOHERTY  2,001,487
THROTTLE VALVE
Filed May 5, 1933
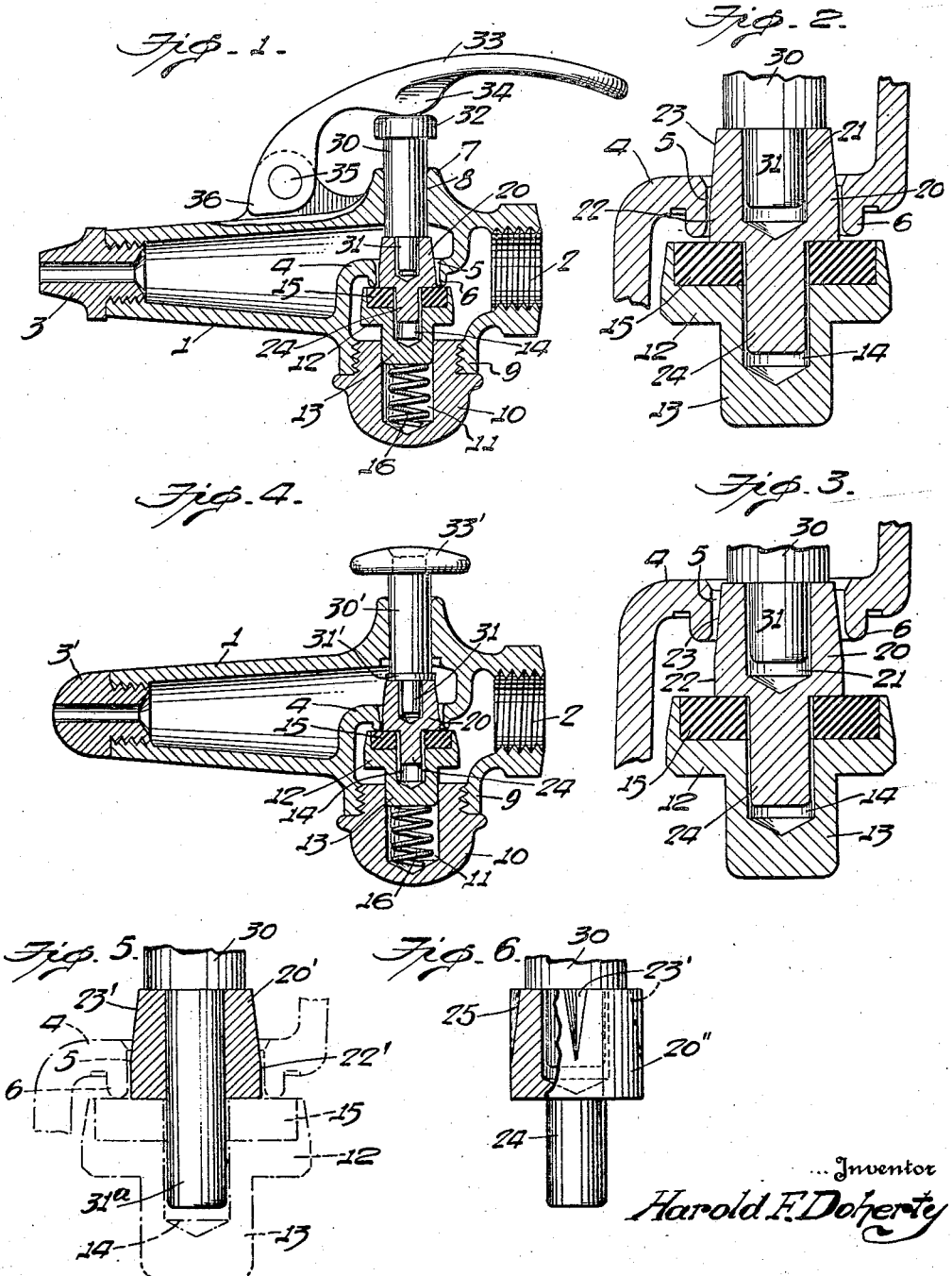
Inventor
Harold F. Doherty
By Ritter, Mechlin & O'Neill
Attorneys Patented May 14, 1935

2,001,487

UNITED STATES PATENT OFFICE 2,001,487

THROTTLE VALVE

Harold F. Doherty, Bridgeport, Conn., assignor to Jenkins Bros., New York, N. Y., a corporation of New Jersey Application May 5, 1933, Serial No. 669,601

5 Claims. (Cl. 251—134)

The invention relates to certain improvements in throttle valves especially adapted for use in connection with air guns and has for its object to provide a valve of this type capable of close and accurate throttling throughout various ranges of adjustment without incurring the abrasive action in valves of this character, to which end the device includes a valve head provided with a disk or washer of resilient material cooperating with a valve seat, said head being an independent element guided in the valve casing and adapted to be engaged with the valve seat by a spring and to be moved away from the seat by a stem, guided in the casing, with a special adapter interposed between the stem and the valve head and occupying the opening in the valve seat, said adapter being of a form to provide a very restricted opening through the valve seat during the first part of the opening movement of the head and to afford an increasingly larger opening during the latter part of the opening movement of said head.

The invention is illustrated in the accompanying drawing, in which:—

Fig. 1 is a sectional elevation of an air gun involving the novel valve construction.

Fig. 2 is an enlarged fragmentary sectional elevation showing the valve in its initial opening relation.

Fig. 3 is a similar view showing the valve fully opened.

Fig. 4 is a view similar to Fig. 1 showing a modified construction.

Fig. 5 is a fragmentary view, partly in section and partly in phantom outline, illustrating a modification of the adapter.

Fig. 6 is an elevation partly in section of a further modification of the adapter.

It has been the usual practice to provide throttling air guns with a frusto-conical valve member in which the tapered sides of the valve head subserve the dual function of throttling and completely closing the opening through the valve seat. Valves of this character have usually been provided with metal to metal seating surfaces to prevent sticking or plugging, which would result, if the valve head were made of soft material, such as rubber. In throttling valves of this type, including the metal to metal contact between the plug or head and the seat, it has been found difficult to prevent leakage, due to the abrasive action of the air or gases under pressure passing between the valve head or plug and the walls of the seat.

The present invention is designed to provide a special form of valve which will not only insure a tight seal between the valve head and the seat, when the valve is closed, but will effectively offset the erosive or abrasive effects of the high pressure gas or air and will insure an accurately regulated throttling action, whenever the same is found necessary.

Referring to Figs. 1, 2 and 3 of the drawing, 1 indicates the valve casing, which is illustrated as constituting the nozzle of an air gun, provided at one end with a threaded coupling 2 adapted to be connected with the air line and at its opposite end with a tip 3. The intermediate portion of the casing is formed with a partition or diaphragm 4 having a circular opening 5 therein surrounded by a crowned flange constituting the valve seat. The casing is formed with a neck portion 7 having an opening 8 therein in axial alignment with the valve seat opening and also in axial alignment with a threaded boss 9 on the opposite side of the casing, which is closed by a cap 10 having a counterbore 11 therein.

Cooperating with the valve seat 6 is a valve head comprising a body portion 12 having a central boss 13 thereon, which engages the opening 11 in the cap 10 and serves as a guide for the valve head, which latter is provided on its upper face with a disk or washer 15 of rubber or like resilient material, said valve head being normally moved by a spring 16 to engage the washer or disk 15 with the valve seat. Loosely engaging the valve head is an adapter 20, which consists of a body portion of plug-like form having a boss 24 projecting from one face and engaging the counterbore 14 in the valve head 12, the opposite face being provided with a counterbore or socket 21. The portion of the adapter immediately adjacent the upper face of the valve head 12 is cylindrical in cross section and closely approximates the opening 5 in the valve seat in cross sectional area, leaving a relatively small annular space between the cylindrical surface 22 and the inner wall of the valve seat opening 5. The remainder of the adapter 20 is generally frusto-conical in shape, as indicated at 23, so that, when this portion of the adapter occupies the space defined by the valve seat opening, a regulable and gradually expanding annular opening between the adapted and the walls of the valve seat opening is afforded, as indicated in Fig. 3.

Slidably mounted in the opening 8 in the neck 7 of the valve casing is a stem 30 provided with a reduced lower end 31, which loosely engages the socket 21 in the adapter. The stem is finished with a button-like head 32, the top surface of which is engaged by a cam 34 formed on an operating handle 33, which is pivoted at 35 in perforated lugs formed on the valve casing, the end of the lever adjacent the pivotal point being provided with an abutment 36 which limits the swinging movement of the lever 33 and prevents the latter being moved far enough to permit the accidental displacement of the stem 8. In this particular construction and arrangement, the valve head 12, the adapter 20 and the stem 30 are formed as separate units so that any one of said elements may be separately removed and replaced in case of undue wear or other impairment. Moreover, the loose engagement of the adapter with both the stem and head permits the adapter to shift or move laterally a limited distance with respect to those parts, so that it will accommodate itself to the aperture 5 in the diaphragm. This eliminates the extreme precision in manufacture heretofore required to bring the stem, the valve head and the adapter into such perfect axial alignment as would be necessary to provide a very small working clearance, such as from two and one-half thousandths to five thousandths of an inch, between the adapter and the wall of the aperture in the diaphragm. In operation, the valve is normally closed by the spring 16, which forces the flexible disk or washer 15 carried by the valve head 12 firmly into engagement with the flange-like valve seat 6, thereby effectively sealing the air gun against the escape of air. When it is desired to deliver a relatively small and regulated quantity of air from the gun, the lever 33 is depressed slightly, thereby moving the valve head away from the seat 6 a slight distance, but, in view of the relatively close fit of the cylindrical portion of the adapter within the valve seat opening, only a small annular opening between the same and the valve seat walls is provided. Should it be desired to deliver a larger quantity of air, the handle is depressed still further, thereby moving the valve head further away from the valve seat and bringing the tapered portion of the adapter into registry with the opening 5 in the valve seat, the extent of depression of the adapter determining and regulating the quantity of air passing between the adapter and the wall of the valve seat opening. The rapidly moving current of air passing through the valve in various positions of the latter exercises little or no abrasive effect on the resilient disk or washer 15 and, even if the valve seat should be roughened or abraded by the passing air, the resilient washer would nevertheless effectively stop all leakage of air through the valve. when the latter is closed, which is a condition not obtainable in the usual type of throttle valves of this character in which the moving element in the form of a head or plug is usually frusto-conical and fashioned to fit a conical opening in the valve seat. With the ordinary type of conical valve head or plug and conical seat, any abrasion of the metal to metal elements would inevitably result in leakage of the air and increasing impairment of the parts.

The modification of the device as shown in Fig. 4 differs from that in the preceding figures only in respect of the operating stem 30', which latter is provided with a collar 31', which limits the outward movement of the stem and a button-like head 33', which may be riveted or otherwise secured to the outer end of the stem.

In the modification shown in Fig. 5, the boss 31ª on the inner end of the stem 30 is prolonged and extends into the socket or counterbore of the valve head 12 and the adapter 20' is formed as a collar-like element loosely surrounding the boss 31ª and provided with a lower cylindrical section 22' and an outer tapered section 23' similar in all respects to these features in the preceding modifications, the cylindrical section permitting only a small annular opening between the wall of the valve seat opening and said cylindrical surface, when the valve is only partly open, but affording a regulable flaring opening, when the conical portion of the adapter is moved downwardly into the aperture in the valve seat.

In the modification shown in Fig. 6, the adapter 20" is substantially cylindrical in contour and is provided with outwardly flaring grooves 25 extending longitudinally of the surface of the adapter, which grooves present regulably increasing passages for the air, as the adapter is moved downward with respect to the valve seat, the lower cylindrical portion of the adapter serving to restrict the air passage to a very narrow annular opening during the initial opening movements of the valve.

It is to be observed that the various modifications of the invention, as described, all involve the same general structural and operative principles, namely, a valve head having a flat engaging sealing surface cooperating with the flanged valve seat and preferably fitted with a resilient disk or washer, which will effect a complete seal with the valve seat, the valve head being associated with an adapter which may move laterally to accommodate itself to the valve opening and which is fashioned to provide only a small opening through the valve seat during the initial opening movements of the valve head and to provide a gradually increasing and regulable opening or passage through the valve seat during the final opening movements, so that the flow of air through the valve may be accurately regulated at all times.

What I claim is:

1. A throttle valve, comprising a casing having an apertured diaphragm forming a valve seat, a valve head guided in said casing and cooperable with the valve seat, a spring normally seating the head, a stem guided in said casing for moving the head away from the seat, and an adapter interposed between the stem and the head, said adapter being displaceable laterally with respect to the stem and head to accommodate itself to the aperture in the diaphragm and being of a form to provide a restricted opening between its periphery and the wall of said aperture during the first part of the opening movement of the head and to afford an increasingly larger opening during the latter part of the opening movement of said head.

2. A throttle valve as described in claim 1, in which the adapter includes a section closely conforming to the cross sectional area of the valve seat aperture and an adjacent section of gradually decreasing cross sectional area.

3. A throttle valve as described in claim 1, in which the valve seat aperture is circular, the section of the adapter adjacent the valve head is cylindrical and of slightly less diameter than said opening and the following section of said adapter is frusto-conical.

4. A throttle valve, comprising a casing having an apertured diaphragm forming a valve seat, a valve head guided in said casing and cooperable with the seat, a stem member guided in said casing for moving the head away from the seat, and an adapter member operatively interposed between the stem member and the head, said head having a recessed portion and one of said members having a portion fitting loosely within said recessed portion for permitting the adapter to move laterally with respect to the head for accommodating itself to the aperture in the diaphragm, said adapter being formed to provide a restricted opening between its periphery and the wall of said aperture and being of less cross sectional area adjacent its upper portion than adjacent its lower portion.

5. A throttle valve, comprising a casing having an apertured diaphragm forming a valve seat, a valve head guided in said casing and cooperable with the seat, a stem guided in said casing for moving the head away from the seat, and an adapter interposed between the stem and head, said adapter having a projecting portion extending into the head and said stem having a projecting portion extending into the adapter, said projecting portions being of less cross sectional area than the respectively cooperating portions of the head and adapter to permit the adapter to move laterally with respect to the head and stem for accommodating itself to the aperture in the diaphragm, said adapter being formed to provide a restricted opening between its periphery and the wall of said aperture.

HAROLD F. DOHERTY.